Oct. 18, 1938.  C. B. MIRICK  2,133,303
SYSTEM FOR LOCATING THE POSITION OF MOVABLE OBJECTS
Filed Nov. 15, 1935  2 Sheets-Sheet 1
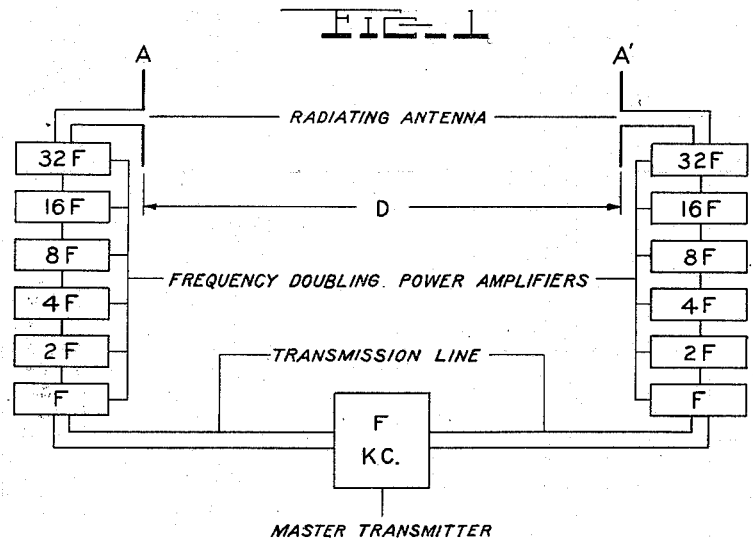
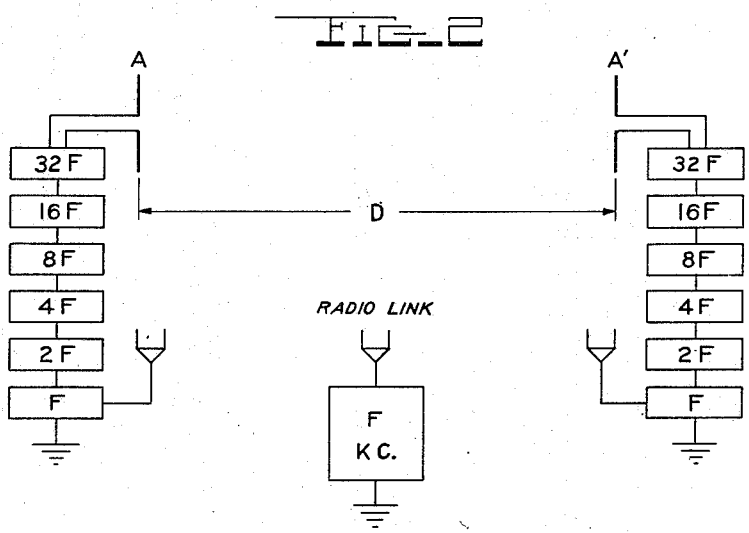
INVENTOR
Carlos B. Mirick
BY
ATTORNEY

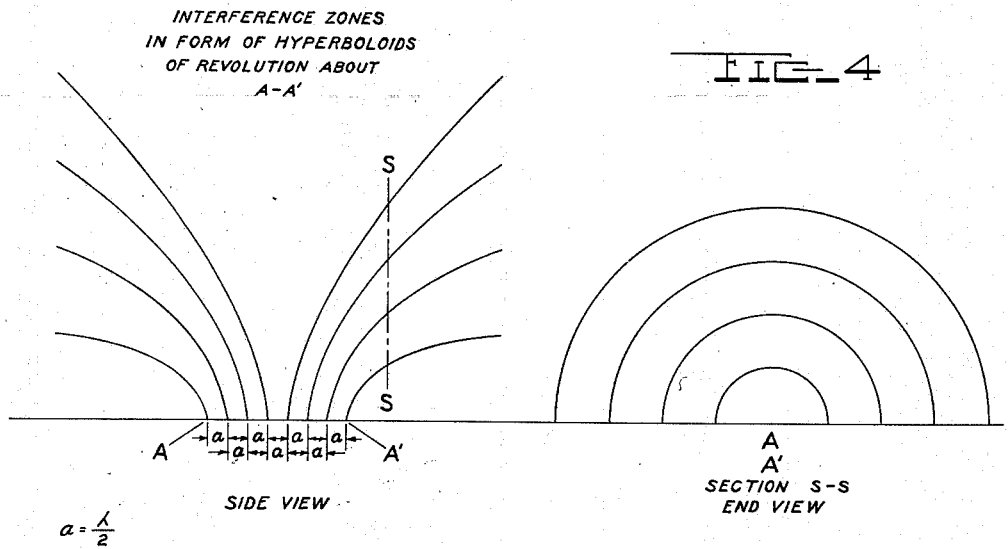
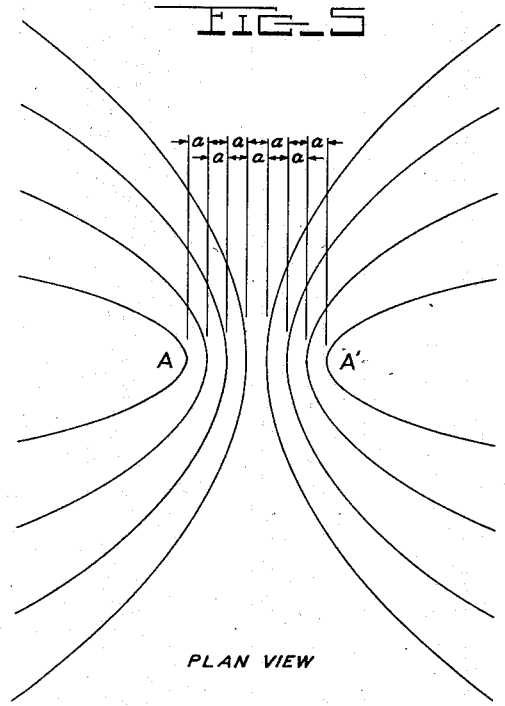

Patented Oct. 18, 1938

2,133,303

UNITED STATES PATENT OFFICE 2,133,303

SYSTEM FOR LOCATING THE POSITION OF MOVABLE OBJECTS

Carlos B. Mirick, Washington, D. C.

Application November 15, 1935, Serial No. 49,952

1 Claim. (Cl. 250—11)

(Granted under the act of March 3, 1883, as amended April 30, 1928; 370 O. G. 757)

This invention relates to radio and to the use of a standing wave pattern in space for homing or determining the location of a movable object.

Shanklin in U. S. Patent 1,942,262 issued January 2, 1934, shows an apparatus for producing and a method for usefully employing a standing wave pattern in space. He uses a very long wave and employs the pattern set up for determining the location of a means of transit in a given area. From the length of waves employed and the description of the distance between successive interference bands, it is apparent that Shanklin presents the picture as it exists in a plane approximating the horizontal, and over a wide area.

Jacquemin in U. S. Patent 1,919,556 issued July 25, 1933, discloses a method for using a standing wave pattern for locating objects in space, depending primarily upon the employment of one nodal axis between the two transmitting stations, which axis and its properties are ingeniously manipulated to produce various useful results.

This invention relates primarily to the location and homing of aircraft by means of a standing wave pattern having multiple interference zones over a limited area, and serving to guide the aircraft from a position aloft to a landing place.

One object of my invention is the setting up of an interference pattern from short wave radiated energy in space.

Another object is the use of the interference pattern thus set up to determine the location of a means of transit with respect to the radiating source.

Another object is to provide a means and method for guiding the course of a means of transit to bring it home to the radiating source.

Another object is to provide a means for guiding the course of surface vessels in a fog with respect to the radiating source.

Another object is to provide a series of interference bands to serve as invisible markers in space. Their separation, at any distance from the source, being known, they can be used in measuring distance travelled and timing the passage of a movable object along a line crossing said interference zones.

Other objects and uses of the invention will be apparent from the description which follows.

In the accompanying drawings, forming part of this specification, and wherein like numerals are employed to designate like parts throughout the same, Fig. 1 shows a master transmitter, oscillating at some lower frequency F kcs., connected through transmission lines to frequency multiplying devices located at the input of high frequency radiating doublets, A, A'. The frequency is stepped up by repeated multiples, as 2F, 4F, 8F, etc., to the desired high frequency to which the doublets are adjusted. Since the radiation is derived from a common source, the frequency may be held the same at each radiator and the phase relation may be kept constant.

Fig. 2 shows a similar arrangement in which the transmission lines are replaced by links of ordinary low frequency transmission and reception.

Figs. 3, 4, and 5 show three dimensional projections indicating the shape of the interference zones or surfaces set up in space, by means of the apparatus described herein, for which the high frequency radiating doublets are foci. The distances, $a$, $a$, etc., Figs. 3 and 5, mark the intercepts of these hyperboloid surfaces with their common axis. Then "$a$" equals $$\frac{\lambda}{2}$$

where $\lambda$ is the wave length of the high frequency radiation.

To create an interference pattern such as is used in this invention, I use two transmitting stations radiating at the same frequency and with constant phase relation. This may be accomplished in one way by using a crystal controlled master oscillator at a lower frequency (say, 3000 kcs. for example) and transmitting its output through transmission lines or by radiated energy to frequency multiplying amplifiers where the frequency would be stepped up to the desired value, say to 60 megacycles or higher. (Figs. 1 and 2.)

The interference surfaces surrounding a fixed source and a fixed receiving station take the form of ellipsoids. These ellipsoids have a minimum separation of a half wave length for the frequency of radiation. By similar reasoning it may be shown that the interference surfaces surrounding two similar sources of radiation (sources alike in frequency and phase) are hyperboloids for which the line determined by the position of the two radiators forms a common axis and with the radiators themselves as foci. The minimum separation between surfaces is one-half wave length and lies along this axis between the foci.

This separation increases as the distance from the sources increases until where the distance is great compared to the focal distance the hyperboloids approach cones with the mid-point between radiators as a common vertex.

To better visualize such a situation assume two radiators operating at 60 megacycles or 5 meters and separated by 200 meters which is approximately the length of the larger carriers or rigid dirigibles. There would then be 200÷2½ or 80 zones of interference surrounding the structure which would become evident in a receiving airplane as alternate regions of increased or reduced reception. At a distance of 20 miles the distance between like zones should be something like a mile.

A plane confining its flight to any single zone and pursuing the direction in which it dipped toward the earth would be led directly to the sources of radiation. The approach to the sources would be characterized by increased dip and finally by strong and increasingly rapid fluctuations along direction of flight parallel to the axis. The frequency of these fluctuations should reach a maximum when directly over the sources. Such a construction as is here suggested would set up a sort of interference grid in space surrounding some desired point by means of which any number of planes in widely different directions could simultaneously find their way back to it. The receiving equipment on the planes need have no characteristics other than those desirable for good aircraft operation; namely, absence of directional quality for reception.

I wish to point out that where the construction of transmission lines between master radiator and the high frequency multiplying amplifiers is not permissible, it should be physically possible to substitute radio frequency transmission and reception in lieu of them and still maintain synchronization of the high frequency radiators.

It will be understood that what has been described for aircraft will apply also to movable objects on the surface or under water, and application to these other media will be seen to come within the scope of this invention.

The methods shown for use with radio waves will be understood to apply also to accoustic, mechanical, or optical waves used in the same fashion.

The invention described herein may be manufactured and used by or for the Government of the United States of America for governmental purposes without the payment of any royalties thereon or therefor.

I claim:

In a navigation system, means for establishing three dimensional radiant energy interference patterns in space for orienting a mobile receiver, comprising a pair of doublet antennae disposed in positions on opposite sides of a homing space within a navigable area with the axes of the doublets extending parallel to each other for establishing over said navigable area a plurality of spaced three dimensional hyperboloidal zones of radiant energy, means individual to each of said doublet antennae for impressing high frequency energy thereon, a high frequency oscillator, an antenna system located intermediate said doublet antennae and connected with said oscillator, and separate receiving antennae connected with each of said first mentioned means, for controlling the radiation of energy from each of said doublet antennae in accordance with the radiation of energy from the antenna system connected with said oscillator.

CARLOS B. MIRICK.